Dec. 14, 1965 J. W. CANNON 3,223,957

THREE-DIMENSIONAL PLUGBOARD CIRCUIT SELECTOR

Filed July 22, 1963

JOHN W. CANNON,
INVENTOR.

By Beehler & Shanahan
ATTORNEYS.

3,223,957
Patented Dec. 14, 1965

3,223,957

THREE-DIMENSIONAL PLUGBOARD CIRCUIT SELECTOR

John W. Cannon, 6520 W. 6th St., Los Angeles 48, Calif.

Filed July 22, 1963, Ser. No. 296,684
5 Claims. (Cl. 339—18)

This invention relates generally to a plugboard circuit selector, and more particularly, to a three-dimensional plugboard in the form of a laminated block structure comprised of alternate circuit boards and spacer boards, and novel plug means of assorted lengths for interconnecting selected circuit elements on the adjacent surfaces of a pair of circuit boards lying on opposite sides of the same spacer board.

The rapid expansion of complex electronic circuit devices in industrial and military applications has brought with it a demand for circuit structures which can be easily revised by manual plug-in means. The old fashioned circuit chassis with a completely soldered wire circuit has proven completely inadequate, since changes are frequently required, and hours of tedious work by skilled personnel would be required to trace circuits through wiring and rewire by the traditional methods.

A forerunner of modern plug-in systems was the old and familiar manual telephone switchboard, with its retractable plugs, and interconnecting plug lines.

In modern electronic circuitry, a great variety of plug-in systems have been employed. For example, a complex circuit has been subdivided into a large number of components, each wired separately on its own card, and then all cards plugged into some type of card-holding box or other structure.

However, almost all of these previously known devices continue to be either too complex or too bulky for circuits in which it is desirable to have a great variety of possible alternative connections available, where connection is to be made by a relatively unskilled person without any knowledge or understanding of the internal construction of the circuit. In such applications, it is much preferred that interconnection be achieved by plug-in means of simple construction and free of any wiring which might be tangled or broken.

Moreover, the plug-in circuit card is too complex and fragile a device to be placed in the hands of unskilled personnel, and further more is an entirely unnecessary expense in many important applications.

Wire-less plug-in means heretofore known have generally presented only a very limited choice of circuit interconnections. Interconnecting plug-in jacks have generally followed the designs of pre-transistor technology, and are not well suited to achieving selection of a variety of circuit connections at one and the same jack receptacle.

It would be extremely advantageous in both experimental work and in the limited production characteristic of complex electronic computer and control devices to have a plugboard circuit selector comprised almost exclusively of standard components. The engineering department could then quickly fabricate a variety of experimental "bread-board" models which would closely simulate the ultimate product in size and structure. Heretofore, however, "bread-board" circuit means have generally been of a space-consuming and fragile structure completely unsuited for use in an end product.

It is the major object of the present invention to provide a plugboard circuit selector constructed of standard circuit board and spacer board parts, and offering a great variety of possible interconnections along X, Y, and Z axes.

It is another object to achieve the advantages of the invention by means of a plug structure in which the plugs are extremely simple in construction and are readily distinguishable, one from the other, by visual inspection by unskilled personnel.

Still another important object of the invention is to provide a three-dimensional plugboard circuit selector suitable both for experimental and production use, but of extremely rugged and compact construction.

Still another important object of the invention is to provide a plugboard circuit selector in which the circuit boards are readily adapted to use with transistor and other solid-state circuits. For example, it is an important advantage of the present invention that the circuit boards may be readily disassembled from the selector, and revisions made in any of the semiconductor elements thereon. Furthermore, the selector is so constructed that terminal edges of each circuit board are supported outboard of the main block structure, so that relatively bulky circuit elements (up to the thickness of the spacer boards) may be mounted on said exposed terminal edges.

The foregoing and other advantages of the invention may be understood from the following description of one preferred specific embodiment, read in connection with the accompanying drawings, in which.

Figure 1:
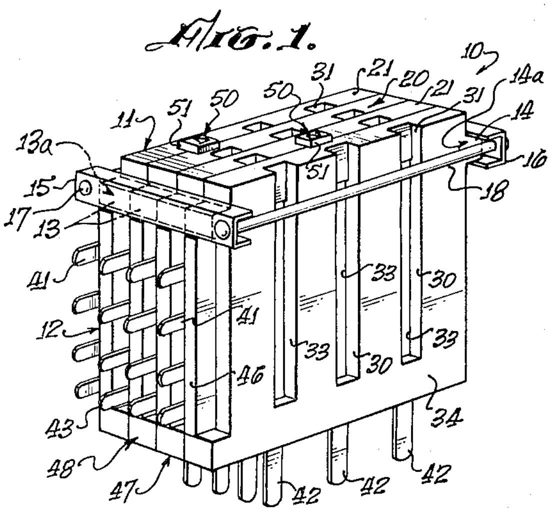
FIGURE 1 is a perspective view of a three-dimensional plug board circuit selector constructed according to my invention.

In FIGURE 1 the numeral 10 is used to indicate generally the three-dimensional plugboard circuit selector.

Figures 3, 4, 5, 6:
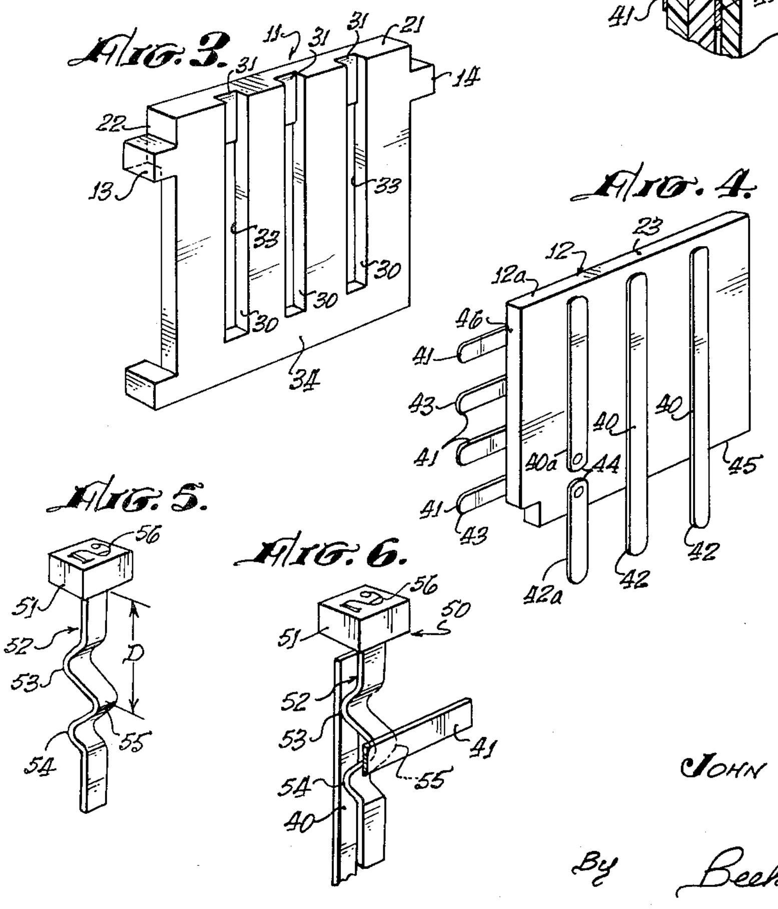
FIGURE 3 is a perspective view of a spacer board of the type used in the construction of FIGURE 1.
FIGURE 4 is a circuit board of the type used in the construction of FIGURE 1.
FIGURE 5 is a typical interconnecting plug suitable for use with the construction illustrated in FIGURE 1.
FIGURE 6 is a perspective view showing the manner in which adjacent connector strips, on circuit boards on opposite sides of a spacer board, are interconnected by the insertion of the plug means of FIGURE 5.

It will be seen that the circuit selector 10 is in the form of a laminated block structure comprised of alternate spacer boards 11 and circuit boards 12, which are seen in greater detail in FIGURES 3 and 4, respectively.

The laminated structure of circuit selector 10 may be held firmly in assembled condition by any suitable means. In the specific embodiment illustrated, each of the spacers 11 is provided with an oppositely disposed pair of edge shoulders 13 and 14, which, in the assembly illustrated in FIGURE 1, provide continuous side shoulders 13*a* and 14*a*. A pair of channel members 15 and 16 fit over shoulders 13*a* and 14*a*, respectively, and are held in position by a pair of tie bars 17 and 18.

The circuit selector 10 is seen to have the shape of a six sided rectangular parallelepiped, with a front plug-in face 20, which is comprised entirely of contiguous portions of the upper, or plug-in, edges 21 of the spacer members 11. It will be seen from the sectional portion of the fragmentary perspective view of FIGURE 2 that the plug-in edges 21 are provided along one side with a shoulder 22, which overhangs and encloses the upper or plug-in edge 23 of the adjacent circuit board 12. Thus, at the plug-in face 20, circuit boards 12 are entirely concealed behind a continuous surface formed of contiguous portions 21 of the spaced boards 11.

The spacer boards 11 are provided with a plurality of vertical slots 30, having upper end openings 31 in the plug-in face 20. These slots serve as the plug receptacles for the plugboard circuit selector 10.

The perspective view of FIGURE 3 reveals that the slots 30 provide vertically extended apertures 33, whose opposite openings face on adjacent circuit boards 12, and make it possible to interconnect adjacent faces of the circuit boards 12 by means of a plug-in interconnection means described hereinafter. Note, however, that the spacer board slots 30 are closed at their lower ends, so that shoulder 22 at the upper edge of spacer board 11, and the continuous lower edge 34, form a rigid board structure.

The circuit boards 12 are constructed as illustrated in FIGURE 4, being comprised of an insulating board panel **12*a*, which is provided with a plurality of vertical connector strips 40 on one face, and a plurality of horizontal connector strips 41** on the opposite face.

It will be understood that both the spacer boards 11 and the circuit board panels **12*a* are made up of insulating material. Connector strips 40 and 41, however, are electrically conductive. They may be printed circuit, inlays, laminates exposed by etching, or any structure by means of which electrically conductive connector strips 40 and 41 are exposed on an otherwise non-conducting panel 12*a***.

Without any restriction on the utility of the invention, but solely for purposes of discussion and identification and description, the vertical connector strips will be hereinafter referred to as X connector strips, and the horizontal connector strips 41 as Y connector strips, since such terms suggest X and Y co-ordinate locations in a plane parellel to circuit board 12.

It will be noted also, that each of the X and Y connector strips 40 and 41 is provided with a terminal member such as 42 for the X connector strips, and 43 for the Y connector strips, which extend beyond the edges of the circuit board panel **12*a*. Terminals 42 and 43 may be mere extensions of the connector strips 40 and 41, or may be specially mounted strips of copper, or may actually be entirely separate and apart from the connector strip as indicated for the X connector strip 40*a* and terminal 42*a*. In usch a case, some interconnecting device would be used to connect their adjacent ends at 44**. For example, there are applications in which an isolation diode might be inserted at this point.

Figure 2:
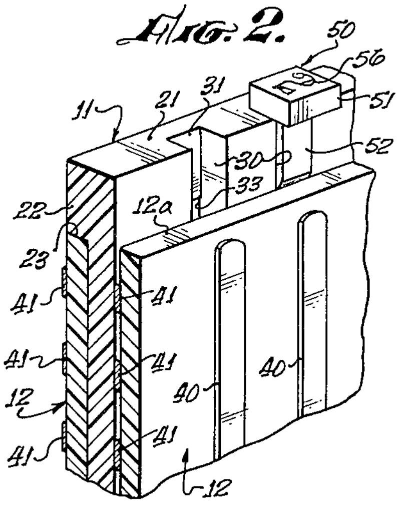
FIGURE 2 is a perspective view showing, fragmentarily, one spacer board and the two circuit boards on each side thereof, and also, one plug-in means, shown inserted into interconnecting position.

It will be noted from FIGURE 2 that there is an X connector strip 40 aligned with each of the spacer board slots 30, so that one side of each of said slots 30 has a connector strip extending along substantially its entire length.

On the other hand, the Y connector strips extend transversely of the slots 30 so that the aperture 33 on the side of slot 30 opposite that in which an X connector strip 40 is located, is crossed at vertically spaced intervals by a series of horizontal Y connector strips 41.

For purposes of convenient labeling, the edge of each circuit board 12 upon which the X terminals 42 are located may be described as the X terminal edge 45, and the vertical edge at which the Y terminals 43 are located may be identified as the Y terminal edge 46.

Correspondingly, the face of circuit selector 10 opposite the plug-in face 20, namely, bottom face 47 may be identified as the X terminal face of circuit selector 10, and the side face 48, at which the Y terminals are located, may be identified as the Y terminal face of the circuit selector 10.

It will be noted that the X and Y terminal edges 45 and 46 of the circuit boards 12 project a substantial distance beyond the edges of the spacer boards 11 at the X and Y terminal faces 47 and 48. This provides a convenient space for accommodating leads attached to the terminals 42 and 43, and for circuit items mounted at the location 44 as previously described.

FIGURE 5 is a perspective illustration of a typical plug interconnector 50, which is seen to be comprised of a cubical stop and handle member 51 and a substantially vertically extended strip of resilient brass or copper, or the like, 52.

The entire strip 52 can be inserted into one of the slots 30, but stop member 51 is larger in cross section than the open end 31 of slot 30, so that, at maximum insertion of plug interconnector 50, stop member 51 seats on plug-in surface 20 as illustrated in FIGURES 1 and 2.

As plug interconnector 50 is inserted, a double contact is made with the adjacent X connector strips 40 by means of a pair of sliding contacts 53 and 54. These contacts make electrical contact with X connector strips 40 regardless of the length of strip 52, or the degree of insertion.

However, when the plug interconnector 50 is fully inserted, it makes contact with only one Y connector strip, contact being made by means of the Y contact point 55. Just which Y connector strip will be contacted is determined by the distance indicated by the letter D. For convenience, the Y connector strip is identified on the exposed face of stop member 51 by a numeral as indicated at 56.

In FIGURE 6, the circuit board panels **12*a* and the spacer board 11 have been eliminated in order to show in perspective the manner in which the plug interconnector 50 places an X connector strip 40 in electrical connection with a selected Y connector strip 43**.

It will be seen from the foregoing description that, relative to the plug-in face 20, X co-ordinates may be considered as measured at spaced intervals along the upper edges of the circuit boards 12, whereas Y co-ordinates correspond to the distance downwardly behind the plug-in surface 20. Z co-ordinates may be considered as measured horizontally normal to the circuit boards 12.

By suitable insertion of plug interconnectors 50, and connections from the terminals 42 and 43 to suitable inputs, outputs, and to each other, a great variety of interconnecting arrangements may be achieved. Moreover, the circuit boards 12 need not be simply insulating panels **12*a* and conductive connector strips 40 and 41, but may include various circuit elements, especially at the terminal edges 45 and 46, and not all of these be alike for every circuit board 12**.

The finished product can be made to provide a great number of circuit rearrangements which may be produced simply by the insertion of various numbered plug interconnectors 50, which may be inserted by unskilled personnel pursuant to private instructions of a simple kind.

It will be understood that the preferred specific embodiment described is but one of many possible versions of the invention. It is not my intention to be restricted to the details as illustrated in the drawings, but to comprehend all variations and departures therefrom, which fall within the spirit of the invention as defined in the following claims.

For example, the embodiment of FIGURE 1 shows a circuit selector with only three X co-ordinate values and only five Y co-ordinate values, and only four circuit boards 12. It will be obvious that many decimal digital applications will call for ten circuit boards 12, each bearing ten X connector strips 40 and ten Y connector strips 41. Likewise, in such an embodiment, the spacer boards 11 will have ten slots 30.

Also, it will be evident that the construction of the plug-in means 50 has many advantages, particularly because of the resilience of the strip 52, which permits sliding insertion of the strip 52, while resiliently urging the contact points 53, 54, and 55 into appropriate contact as indicated in FIGURE 6. However it will be obvious that it would be easy to present equivalent construction for spacer boards 11, circuit boards 12, and plug interconnectors 50, as well as various means for holding the entire laminated structure in assembly as indicated in FIGURE 1.

Having thus described my invention, what I claim as new and desire to secure by Letters Patent is:

1. A plugboard circuit selector which includes: a laminated block structure comprised of an assembly in alternate arrangement of circuit boards and spacer boards, said block structure having X and Y terminal faces at right angles to said boards and to one another, and a plug-in face on the opposite side of said block structure from said X terminal face; walls in said spacer boards defining plug-in slots longitudinally normal to said plug-in face, each of said slots having an open end at said plug-in face; a plurality of parallel X connector strips, said strips being disposed at said slots in longitudinal alignment therewith and extending to terminal locations at said X terminal edges; a plurality of parallel Y connector strips, said Y connector strips being disposed transversely to said slots and said X connector strips and extending to terminal locations at said Y terminal edges; and plug interconnector means of assorted lengths adapted to be inserted into said slots at said plug-in face and interconnect a selected X connector strip with a selected Y connector strip.

2. A plugboard circuit selector which includes: a laminated block structure comprised of an assembly in alternate arrangement of circuit boards and spacer boards, said block structure having X and Y terminal faces at right angles to said boards and to one another, and a plug-in face on the opposite side of said block structure from said X terminal face; X and Y terminal edges on said circuit boards; walls in said spacer boards defining plug-in slots longitudinally normal to said plug-in face, each of said slots having an open end at said plug-in face; a plurality of parallel X connector strips on one face of each said circuit boards, said strips being disposed at said slots in longitudinal alignment therewith and extending to terminal locations at said X terminal edges; a plurality of parallel Y connector strips on each of said circuit boards, on a face opposite to that bearing said X terminal strips, said Y connector strips being disposed transversely to said slots and said X connector strips and extending to terminal locations at said Y terminal edges; and plug interconnector means of assorted lengths adapted to be inserted into said slots at said plug-in face and interconnect a selected X connector strip with a selected Y connector strip on an adjacent circuit board.

3. A plugboard circuit selector which includes: a laminated block structure comprised of an assembly in alternate arrangement of circuit boards and spacer boards, said block structure having X and Y terminal faces at right angles to said boards and to one another, and a plug-in face on the opposite side of said block structure from said X terminal face; X and Y terminal edges on said circuit boards; walls in said spacer boards defining plug-in slots longitudinally normal to said plug-in face, each of said slots having an open end at said plug-in face and a closed end at said X terminal face, and each slot providing open communication, over at least part of its length, between the adjacent faces of circuit boards on each side of said spacer board; a plurality of parallel X connector strips on one face of each said circuit boards, said strips being disposed at said slots in longitudinal alignment therewith and extending to terminal locations at said X terminal edges; a plurality of parallel Y connector strips on each of said circuit boards, on a face opposite to that bearing said X terminal strips, said Y connector strips being disposed transversely to said slots and said X connector strips and extending to terminal locations at said Y terminal edges; and plug interconnector means of assorted lengths adapted to be inserted into said slots at said plug-in face and interconnect a selected X connector strip with a selected Y connector strip on an adjacent circuit board, each said plug means comprising a locating stop adapted to seat on said plug-in face, and sliding X and Y contacts on opposite sides for electrical connections between an X connector strip and a selected one of the Y connector strips communicating with the same slot.

4. A plugboard circuit selector which includes: a laminated block structure comprised of an assembly in alternate arrangement of circuit boards and spacer boards, said block structure having X and Y terminal faces at right angles to said boards and to one another, and a plug-in face on the opposite side of said block structure from said X terminal face; X and Y terminal edges on said circuit boards, said edges projecting outwardly beyond the edges of said spacer boards at said X and Y terminal faces respectively; walls in said spacer boards defining plug-in slots longitudinally normal to said plug-in face, each of said slots having an open end at said plug-in face and a closed end at said X terminal face, and each slot providing open communication, over at least part of its length, between the adjacent faces of circuit boards on each side of said spacer board; a plurality of parallel X connector strips on one face of each said circuit boards, said strips being disposed at said slots in longitudinal alignment therewith and extending to terminal locations at said X terminal edges; a plurality of parallel Y connector strips on each of said circuit boards, on a face opposite to that bearing said X terminal strips, said Y connector strips being disposed transversely to said slots and said X connector strips and extending to terminal locations at said Y terminal edges; and plug interconnector means of assorted lengths adapted to be inserted into said slots at said plug-in face and interconnect a selected X connector strip with a selected Y connector strip on an adjacent circuit board, each said plug means comprising a locating stop adapted to seat on said plug-in face, and sliding X and Y contacts on opposite sides for electrical connections between an X connector strip and a selected one of the Y connector strips communicating with the same slot.

5. A plugboard circuit selector which includes: a laminated block structure comprised of an assembly in alternate arrangement of circuit boards and spacer boards, said block structure having X and Y terminal faces at right angles to said boards and to one another, and a plug-in face on the opposite side of said block structure from said X terminal face; X and Y terminal edges on said circuit boards, said edges projecting outwardly beyond the edges of said spacer boards at said X and Y terminal faces respectively; contiguous shoulders on the plug-in face edges of said spacer boards, said shoulders covering the plug-in face edges of said circuit boards to present a plug-in face comprised entirely of contiguous portions of said spacer boards; walls in said spacer boards defining plug-in slots longitudinally normal to said plug-in face, each of said slots having an open end at said plug-in face and a closed end at said X terminal face, and each slot providing open communication, over at least part of its length, between the adjacent faces of circuit boards on each side of said spacer board; a plurality of parallel X connector strips on one face of each said circuit boards, said strips being disposed at said slots in longitudinal alignment therewith and extending to terminal locations at said terminal edges; a plurality of parallel Y connector strips on each of said circuit boards, on a face opposite to that bearing said X terminal strips, said Y connector strips being disposed transversely to said slots and said X connector strips and extending to terminal locations at said Y terminal edges; and plug interconnector means of assorted lengths adapted to be inserted into said slots at said plug-in face and interconnect a selected X connector strip with a selected Y connector strip on an adjacent circuit board, each said plug means comprising a locating stop adapted to seat on said plug-in face, sliding X and Y contacts on opposite sides for electrical connections between an X connector strip and a selected one of the Y connector strips communicating with the same slot, and resilient means for urging said X and Y contacts into contact with circuit board faces and connector strips thereon adjacent a slot into which said plug interconnector means is inserted.

References Cited by the Examiner

UNITED STATES PATENTS 2,922,135 1/1960 Hoberg et al. ---------- 339—18

JOSEPH D. SEERS, *Primary Examiner.*

PATRICK A. CLIFFORD, *Examiner.*